United States Patent
Hjorth et al.

(10) Patent No.: US 6,816,435 B2
(45) Date of Patent: Nov. 9, 2004

(54) METHOD FOR ESTIMATING THE POSITION OF A DRILL

(75) Inventors: Jan Hjorth, Lidingö (SE); Björn Litzen, Salzburg (AT)

(73) Assignee: Guideline AB, Lidingo (SE)

( * ) Notice: Subject to any disclaimer, the term of this patent is extended or adjusted under 35 U.S.C. 154(b) by 191 days.

(21) Appl. No.: 10/239,841

(22) PCT Filed: Apr. 3, 2001

(86) PCT No.: PCT/SE01/00729

§ 371 (c)(1),
(2), (4) Date: Sep. 30, 2002

(87) PCT Pub. No.: WO01/75268

PCT Pub. Date: Oct. 11, 2001

(65) Prior Publication Data

US 2003/0137899 A1 Jul. 24, 2003

(30) Foreign Application Priority Data

Apr. 4, 2000 (SE) .............................................. 0001215

(51) Int. Cl.[7] .............................................. E21B 47/09
(52) U.S. Cl. .............................. 367/27; 367/51; 367/56; 175/45
(58) Field of Search .............................. 367/25, 27, 51, 367/56; 175/45; 166/250.01, 255.1; 181/112

(56) References Cited

U.S. PATENT DOCUMENTS

| 4,144,949 A | 3/1979 | Silverman .................... 181/106 |
| 4,460,059 A | 7/1984 | Katz ........................... 181/102 |
| 4,922,362 A | 5/1990 | Miller et al. ................... 367/46 |
| 4,964,087 A | 10/1990 | Widrow ....................... 367/45 |
| 5,031,158 A | 7/1991 | Chamuel .................... 367/118 |
| 5,680,906 A | 10/1997 | Andrieux et al. ............. 175/45 |

FOREIGN PATENT DOCUMENTS

| WO | WO 01/75268 | * 10/2000 |

OTHER PUBLICATIONS

Slunga et al, Absolute and relative locations . . . , 1995, RAS Geophys, Jour. Int. 123, pp. 409–419.*

* cited by examiner

Primary Examiner—Nelson Moskowitz
(74) Attorney, Agent, or Firm—Jacobson Holman PLLC

(57) ABSTRACT

The present invention relates to a method for estimating the position and trajectory of a drill during drilling of boreholes in rock. The method comprising the steps of determining the starting position of the drill bit and recording the received transient seismic waves generated by the drill on impact, and estimating the difference in arrival time between events. From these, the relative distances, between the positions of the drill bit at different events are calculated and from these the present position is calculated.

14 Claims, 3 Drawing Sheets

METHOD FOR ESTIMATING THE POSITION OF A DRILL

This is a nationalization of PCT/SE 01/00729 filed Apr. 3, 2001 and published in English.

FIELD OF THE INVENTION

The present invention relates to a method for estimating the position and trajectory of a moving source of seismic waves. In particular, it relates to positioning of a drill during drilling of boreholes in rock.

BACKGROUND OF THE INVENTION

Methods for estimating the position or trajectory of a drill during drilling of boreholes in rock are known, which are based on widely varying techniques, such as compass based instruments, gyroscope based instruments and instruments estimating the position of the drill bit by detecting seismic waves emitted at the position of the drill bit. Of these, several commercialised compass based instruments have failed to achieve their goal due to magnetic reasons, and gyroscope based instruments have failed to achieve their goal due to drifting problems and fragility. Several seismic wave based instruments have failed to achieve the required accuracy due to factors such as varying wave propagation speed in the ground which arises when the ground has an inhomogeneous distribution of rock types with different specific propagation speed, erroneous position estimations when seismic waves are reflected from cracks and at interfaces between rocks having different wave propagation properties.

U.S. Pat. No. 5,680,906 discloses a method for location of the position and trajectory of a drill during drilling of boreholes in rock. The method is based on detecting the seismic waves emitted by the drill bit on impact, and takes advantage of the fact that the transient waves emitted at each impact, hereinbelow termed event, are very similar to each other, such that seismic data recorded at geophones can be averaged for a number of events. The averaging of data from several similar events give a increased signal-to-noise level, which can be useful when detecting events from a drill bit positioned farther away from the geophones than would otherwise be possible. If the precision in determining the arrival time for the events is noise limited, this could also lead to an increased precision.

A general problem with prior art methods for location of a drill, using seismic wave based instruments, is their inherent disability to discern arrival time differences due to varying propagation speeds for waves propagating through rocks with unknown and varying wave propagation properties. If, for example, the wave propagation speed in the rock on a first side of the drill bit is higher than on the other side, the calculated position of the drill bit will be shifted from its real position towards the first side. This is because the geophones situated on the first side will detect a shorter arrival time for an event, than the geophones situated on the other side, and this is interpreted as corresponding distances being shorter and longer than their true values, respectively. Earth models, which make certain assumptions regarding the distribution of the wave propagation properties of the rock, can improve the estimation of the position of a seismic event, but with no advance knowledge of the actual wave propagation properties of the rock, seismic wave based instruments will suffer from a position accuracy which is comparatively low.

SUMMARY OF THE INVENTION

It is an object of the present invention to provide a method for estimating the position and trajectory of a moving source of seismic waves, which suffers significantly less from the above mentioned problem.

The object is achieved with a method according to claim 1.

DESCRIPTION OF A PREFERRED EMBODIMENT

Figure 1:
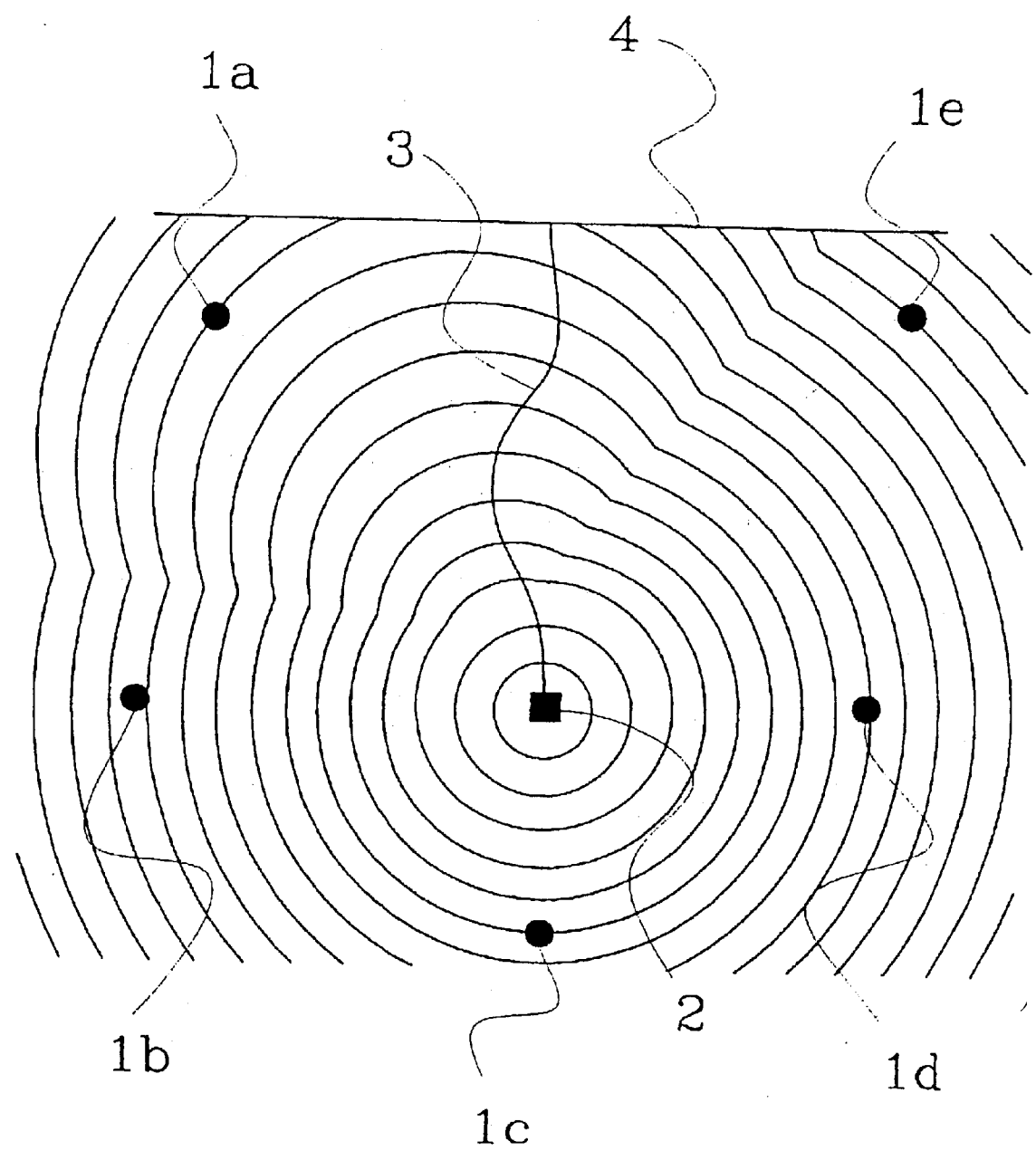
FIG. 1 shows the geophones, the drill and the wave propagation through inhomogeneous rock.

FIG. 1 shows a drill bit 2, its trajectory 3 from the surface 4 to its present position in the ground, and five geophones 1a–e at various positions in the ground. Also shown are seismic waves propagating from the drill bit, illustrated as a series of circles centred essentially at the drill bit. In the upper left portion of the ground, the wave propagation speed is higher than in the rest of the picture, as can be seen by the longer wavelength of the waves in that portion of the ground. It can also be seen that the waves are refracted at the interface between the two portions of the rock having different wave propagation speed.

Geophone 1a will receive a signal from the drill bit earlier than it would if the ground had had an identical wave propagation speed throughout the rock, and the readings from geophone 1a will indicate that the position of the drill is closer to the geophone than it actually is. This can also be intuitively understood by visually estimating the centre of the essentially circular wave fronts in the upper left portion of the figure, as that is the position the drill bit appears to have, for geophone 1a.

For a three dimensional problem, as normally is the case, although the figure is two dimensional, three geophones are necessary to unambiguously determine the position of the drill bit. As the seismic waves might not be detected by one or several of the geophones, it is common practice to use more than three geophones, which makes the problem over determined. To find a solution, which in some sense is the best, one typically minimises a sum of arrival time residuals, $$e_a(i,k) = t_a^{obs}(i,k) - T(i,k),$$

where i denotes geophone no. i, k denotes event no. k, $$t_a^{obs}(i,k)$$

denotes the observed arrival time, and T(i,k) denotes the theoretical arrival time. The sum that is to be minimised could be expressed as $$Q = \sum_{i=1}^{m} \sum_{k=1}^{n} e_a^2(i,k),$$

where m is the total number of geophones and n is the number of events. The theoretical arrival times are a function of the estimated position of the drill bit $\bar{r}(k)$, and the sum, Q, is minimised by finding the $\bar{r}(k)$ which minimises the sum.

Determining the drill bit position with this method will, at its best, achieve an accuracy which is determined by the distribution of seismic wave propagation speeds in the ground. Using a method for determining the distance between similar events, occurring near each other, the difference in propagation speed, and the corresponding arrival time difference would nearly cancel. Adding a series of distances between consecutive positions for the drill, would then result in the present position of the drill bit, with an accuracy which, to first order, is not limited by variations in wave propagation speed. This finally gives a positioning accuracy which far exceeds that of prior art seismic wave based instruments.

The background for making such estimations of the relative locations of similar events is thoroughly described in *Geophys. J. Int.* (1995), 123, 409–419, by Slunga, R Ögnvaldsson and Bödvarsson. In this paper, the method is used for precisely determining the relative position of similar microearthquake events in the ground. In such a case, there is no reference that can be used for finding the absolute positions of the microearthquake, so the final result ends with high precision estimates of the relative positions only. For a drill bit, which makes its way through the rock, however, the starting point can be determined with high accuracy, and by using that, the absolute position of the drill bit can be determined by adding consecutive relative positions. For determining the arrival time difference between two events, with the high accuracy needed for the method to work, the events must be very similar, as is the case for the seismic waves emitted by the drill bit at each impact.

Figure 2:
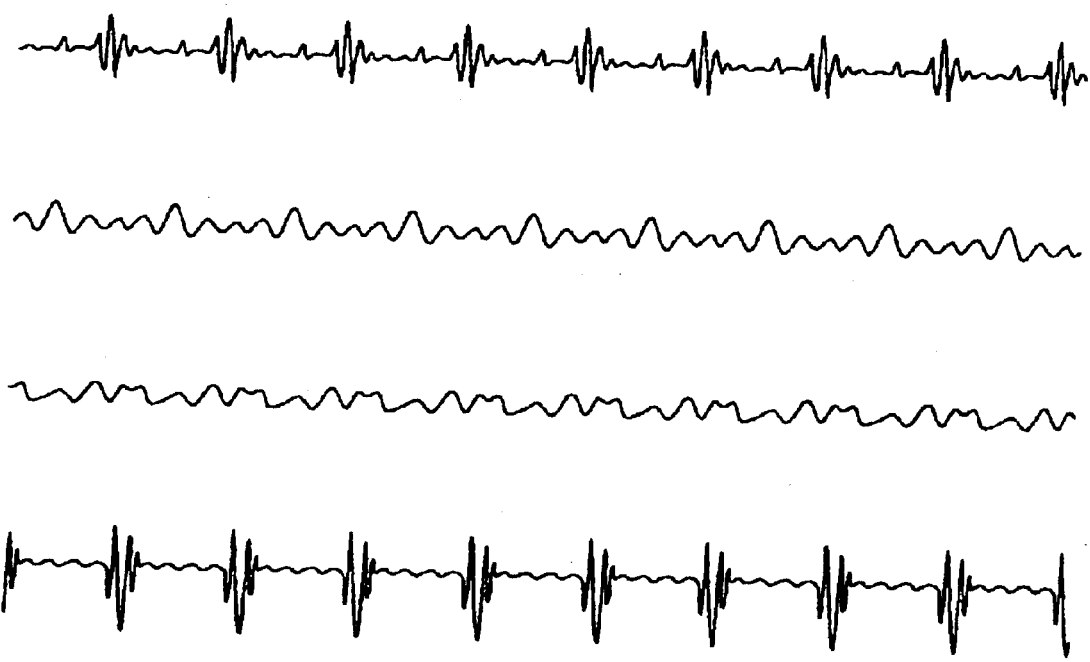
FIG. 2 shows a series of events, as detected by four geophones.

FIG. 2 shows a series of similar events, as detected by four geophones, corresponding to the four traces. As the figure shows, each event has not decayed to zero before the next event occurs, and there is generally no single zero crossing point which can be used for unambiguously determining the arrival time difference between two consecutive events, or two non-consecutive events. The preferred solution is to calculate the correlation between two events, as detected by each geophone. Using this method, an arrival time difference between two events can be estimated with high accuracy, and the accuracy in the estimation can be assumed to be related to the cross correlation value. The arrival time residuals in the square sum of residuals which is to be minimised in *Geophys. J. Int.*, can advantageously be weighted according to a scheme which takes this into account, or estimated arrival time differences with a cross correlation coefficient smaller than a certain value could even be discarded.

The algorithm used in *Geophys. J. Int.* minimises a sum of squared residual terms with respect to estimated distances between events (and estimated absolute positions of events). The residual terms are in this application arrival time difference residuals, $$e_d(i, k_1, k_2) = t_d^{obs}(i, k_1, k_2) - T(i, k_2) + T(i, k_1),$$

where $$t_d^{obs}(i, k_1, k_2)$$

is the estimated difference in arrival time, for geophone i, for events $k_1$ and $k_2$, and T(i,k) is the initially assumed theoretical arrival time, for event k. Such a sum of squared residual terms could be expressed as $$Q = \sum_{i=1}^{m} \sum_{k_1=1}^{n-1} \sum_{k_2=k_1+1}^{n} e_d^2(i, k_1, k_2),$$

where n is the number of seismic wave events. More generally, any function, other than the square function, which is an increasing function for positive valued residuals and a decreasing function for negative valued residuals could be used, such as the absolute value of the residuals, the residuals raised to fourth power, or even a function of the residuals which is not even, as long as it fulfils this criterion. Additionally, these functions which are increasing for positive valued residuals and decreasing for negative valued residuals, need not necessarily be summed. As an example, the product could be calculated and minimised instead. In the most general case, any function of the residuals, which is increasing for each positive valued residual and decreasing for each negative valued residual could be minimised. The reason why a sum of squared residuals is used in *Geophys. J. Int.* is that methods for minimising such a sum are well developed and among the simplest to use. Therefore, the invention will be exemplified by using such a sum, but it should be pointed out that a more general function of the residuals could be used. If the residuals are weighted, such as discussed in the previous paragraph, using a sum of squared residuals, this sum could be expressed as $$Q = \sum_{i=1}^{m} \sum_{k_1=1}^{n-1} \sum_{k_2=k_1+1}^{n} w_d(i, k_1, k_2) e_d^2(i, k_1, k_2),$$

but if a more general function Q is used, the residuals could be weighted in an identical fashion, or alternatively the weights could be included in the properties of Q itself.

The algorithm used in *Geophys. J. Int.* further comprises terms for the absolute position of the event, and according to the authors, the absolute positioning accuracy increases as compared to prior art methods. Including these terms for the application of determining the position of a drill bit in rock is not particularly important, as the calculation of the absolute position is using the starting point position, which can be determined with an accuracy which by far exceeds the accuracy achieved by direct estimation of the absolute position of the drill bit using seismic wave methods.

Additionally, the algorithm used in *Geophys. J. Int.* further comprises terms related to measurement of both the S- and P-waves, corresponding to an expression such as $$Q = \sum_{i=1}^{m} \sum_{j=1}^{2} \sum_{k_1=1}^{n-1} \sum_{k_2=k_1+1}^{n} e_d^2(i, j, k_1, k_2),$$

where j denotes the phase of the seismic waves, being S or P, and also the arrival time differences between these waves, corresponding to an expression such as $$Q = Q = \sum_{i=1}^{m} \sum_{j=1}^{2} \sum_{k_1=1}^{n-1} \sum_{k_2=k_1+1}^{n} e_d^2(i, j, k_1, k_2) +$$
$$\sum_{i=1}^{m} \sum_{k_1=1}^{n-1} \sum_{k_2=k_1+1}^{n} [e_d(i, P, k_1, k_2) - e_d(i, S, k_1, k_2)]^2.$$

Using both the S- and P-wave arrival time data, can give a further accuracy increase, but in practice, typically only one type of wave is clearly discernible, as one wave type often has a much larger amplitude than the other.

The total number of terms in the sum, Q, increases with the square of the number of events, according to the paper in *Geophys. J. Int.*, which means that the size of the numerical problem which is to be solved, increases very rapidly with the number of events. Including all terms in Q, would thus quickly exceed the capacity of a computer intended to present the results to the user. Including only a limited number of terms, such as the p last terms, limits the maximum processing steps needed for the estimation of the present position of the drill bit. If only the p last terms are included, Q could be expressed as $$Q = \sum_{i=1}^{m} \sum_{k_1=n-p-1}^{n-1} \sum_{k_2=k_1+1}^{n} e_d^2(i, k_1, k_2).$$

Generally, the events which are to be included in Q, could be selected according to some other criterion, such as including only those events that are estimated to have originated from a position further away from the other events than a distance larger than the spatial resolution of the device using the method according to the invention. Also, an effective numerical algorithm eases the calculation capability demands on the computer.

Figure 3:
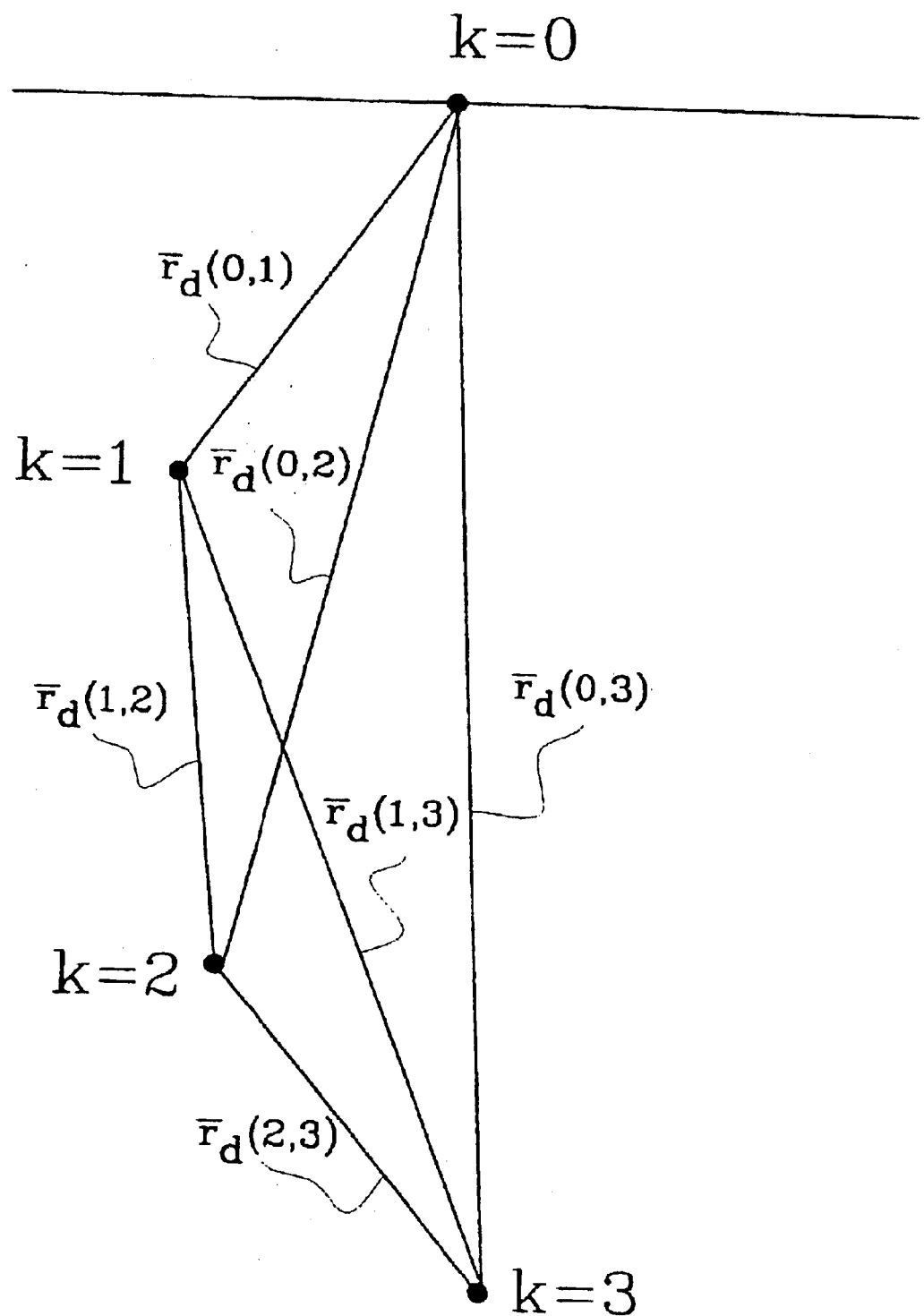
FIG. 3 shows a series of estimated positions for the drill trajectory.

In FIG. 3, four events, and the position of the drill bit at these events numbered k=0 to k=3, are shown. At event k=0, the drill is at its starting position, $\bar{r}_{start}$. The relative distances between events, which minimise the sum of the arrival time difference residuals, are finally added to the starting position, $\bar{r}_{start}$, and the present position of the drill bit, $\bar{r}_{present}$, is estimated. As can be seen from the figure, this summing can be done in different ways, as the present position of the drill bit can be estimated by $\bar{r}_{present} = +\bar{r}_{start} + \bar{r}_d(0,1) + \bar{r}_d(1,2) + \bar{r}_d(2,3)$, or $\bar{r}_{present} = +\bar{r}_{start} + \bar{r}_d(0,1) + \bar{r}_d(1,3)$, or $\bar{r}_{present} = +\bar{r}_{start} + \bar{r}_d(0,2) + \bar{r}_d(2,3)$, or $\bar{r}_{present} = +\bar{r}_{start} + \bar{r}_d(0,3)$.

As indicated by the above discussion, the accuracy of the distance between the positions of the drill bit at two events becomes high if this distance is small, such that errors occurring due to different propagation velocities at different portions of the rock are cancelled. This would in turn imply that the larger the relative distances, the smaller the accuracy of that estimation. It could still give an increased accuracy to use relative distances between non-consecutive events as well, although it is advantageous to give such relative distances a smaller weight factor than relative distances between non-consecutive events.

Errors in the calculated position of the drill bit due to e.g. waves reflected by cracks in the rock, which could cause the trajectory to show a discontinuity, i.e. a sudden shift in the previously smooth trajectory curve, could be compensated for by using various methods. Such a sudden shift could be assumed being a result of an erroneous measurement, if the relative distance between the last two positions of the drill bit deviates strongly from the relative distance between the second last two positions, by e.g. a factor of two. In such a case, the latest relative position could be replaced by the second latest relative position, but more complicated algorithms for calculating the latest relative position could be used, such as a polynomial fit to a number of positions prior to the latest one. If the length of the drill that enters the hole is being measured as the drill bit makes its way through the rock, this could also be used for calculating the actual latest relative position between the last two events.

Other spurious erroneous data, which are obviously incorrect, such as those resulting from a geophone receiving very weak signals, or when the apparent resulting position is positioned very far from where it reasonably must be, could naturally be eliminated.

The final results could be presented, in real time, on a computer screen using graphics or numerical values, or any other presentation form may be used. Naturally, the results could be stored for later analysis, or sent to a remote presentation unit, for controlling the steering of the drill trajectory by an operator elsewhere.

Inasmuch as the present invention is subject to variations, modifications and changes in detail, some of which have been stated herein, it is intended that all matter described throughout this entire specification or shown in the accompanying drawings be interpreted as illustrative and not in a limiting sense.

What is claimed is:

1. A method for determining the position of a drill bit during drilling, comprising the steps of:

determining the starting position, $\bar{r}_{start}$, of the drill bit and the positions of m geophones, $$\bar{r}_i^{geogh},$$

where $1 \leq i \leq m$, and recording the received transient seismic waves generated by the drill on impact, using the geophones, and estimating, from said transient seismic waves, the estimated difference in arrival time, $$t_d^{obs}(i, k_1, k_2),$$

for geophone i, for events $k_1$ and $k_2$, calculating an initially assumed theoretical arrival time T(i,k), for event k, and calculating arrival time difference residuals, $$e_d(i, k_1, k_2) = t_d^{obs}(i, k_1, k_2) - T(i, k_2) + T(i, k_1),$$

where $k_1$ and $k_2$ are different, and calculating a function of the residuals, $Q(e_d(i,k_1,k_2))$, which is an increasing function of positive valued terms and a decreasing function of negative valued terms, and calculating the relative distances, $\bar{r}_d(k_1,k_2) = \bar{r}(k_2) - \bar{r}(k_1)$, between the positions of the drill bit at events $k_1$ and $k_2$, giving theoretical arrival times T(i,k), which minimises Q and calculating the present position, $\bar{r}_{present}$, of the drill bit by calculating the sum of the starting position, $\bar{r}_{start}$, of the drill bit and a sum comprising the relative distances, $$\bar{r}_{present} = \bar{r}_{start} + \sum_{k=1}^{n-1} \bar{r}_d(k, k+1).$$

2. A method according to claim 1, characterised in that Q is minimised with respect to the p last events only.

3. A method according to claim 1, characterized in that residuals in Q are weighted with weights $w_d(i,k_1,k_2)$, such that $Q=Q(w_d(i,k_1,k_2)e_d(i,k_1,k_2))$.

4. A method according to claim 1, characterised in that Q comprises the arrival times of both the S and P seismic waves, such that $Q=Q(e_d(i,j,k_1,k_2))$, where j denotes the phase of the seismic waves, being S or P.

5. A method according to claim 1, characterised in that Q comprises the arrival time differences between S and P waves, such that $Q=Q(e_d(i,k_1,k_2)e_d(i,P,k_1,k_2)-e_d(i,S,k_1,k_2))$.

6. A method according to claim 5, characterized in that residuals in Q, are weighted with weights $w_d(i,k_1,k_2)$ and $w_{ps}(i,k_1,k_2)$, respectively, such that $$Q=Q(w_d(i,k_1,k_2)e_d{}^2(i,k_1,k_2),w_{ps}(i,k_1,k_2)[e_d(i,P,k_1,k_2)-e_d(i,S,k_1,k_2)]).$$

7. A method according to claim 1, characterized in that the sum comprising the relative distances comprises the relative distances between events which are not adjacent, $\bar{r}_d(k,k+m)$, where m>1, and in that the terms in the sum are weighted by factors w(k,m), and in that the sum is normalised correspondingly by a factor N, such that $$\bar{r}_{present} = \bar{r}_{start} + \frac{1}{N}\sum_{m=1}^{n-1}\sum_{k=1}^{n-m} w(k,m)\bar{r}_d(k,k+m).$$

8. A method according to claim 7, characterized in that the weight factors, w(k,m), decrease with increasing m.

9. A method according to claim 1, characterized in that if the latest relative distance, $\bar{r}_d(n-1,n)$, deviates largely from the previous relative distance, $\bar{r}_d(n-2,n-1)$, the latest relative distance is set essentially equal to the previous relative distance.

10. A method according to claim 1, characterized in that the length of the drilled hole is measured, by measuring the length of the drill that has entered the hole, and that a comparison is made between the actual length of the hole and the length as calculated according to any of the previous methods.

11. A method according to claim 10, characterised in that if the latest relative distance, $\bar{r}_d(n-1,n)$, deviates largely from the length of the drill that has entered the hole between events n−1 and n, $\bar{r}(n-1,n)$ is set essentially equal to the previous relative distance, $\bar{r}_d(n-2,n-1)$.

12. A method according to claim 1, characterized in that the estimation of difference in arrival time, $$t_d^{obs}(i,k_1,k_2),$$

for geophone i, for events $k_1$ and $k_2$, is performed by auto-correlating $$t_d^{obs}(i,k_1,k_2)$$

with itself.

13. A method according to claim 12, characterised in that, if the correlation between two successive events recorded by a geophone, is less than a predefined value in the range 0.7–0.9, the resulting difference in arrival time is discarded.

14. A method according to claim 13, characterised in that, if the correlation between two successive events recorded by a geophone, is less than 0.8, the resulting difference in arrival time is discarded.

* * * * *